United States Patent [19]
Tessler

[11] 3,928,321
[45] Dec. 23, 1975

[54] PREPARATION OF STARCH ESTERS
[75] Inventor: Martin M. Tessler, Edison, N.J.
[73] Assignee: National Starch and Chemical Corporation, Bridgewater, N.J.
[22] Filed: May 6, 1974
[21] Appl. No.: 467,109

[52] U.S. Cl............... 260/233.5; 260/233.3 R
[51] Int. Cl.² .................................. C08B 31/02
[58] Field of Search............... 260/233.5, 233.3 R

[56] References Cited
UNITED STATES PATENTS
3,061,604  10/1962  Kerr et al.................... 260/233.5

OTHER PUBLICATIONS

Condensed Chemical Dictionary, 1957 edition, pp. 1009, 1010, and 1011.

*Primary Examiner* — Melvin I. Marquis

[57] ABSTRACT

Aqueous slurries or dispersions of starch are reacted with acyl phosphates to yield starch esters. The starch esters of this invention are useful in a number of end-use applications including use as paper sizing agents.

8 Claims, No Drawings

PREPARATION OF STARCH ESTERS

This invention relates to a novel method for the preparation of starch esters. More particularly, the invention relates to a method for the preparation of starch esters by the reaction of selected acyl phosphates with a starch base under specified reaction conditions.

The modification of starch by chemical derivatization is well known. An excellent review of the preparation of starch esters up to 1968 may be found in "Starch and its Derivatives," by J. A. Radley (1968) Fourth Edition, published by Chapman and Hall, Ltd., London. None of the prior art, however, discloses or suggests the reaction of selected acyl phosphates, as hereinafter described, with a starch base in the presence of water.

It is the prime object of this invention to provide a convenient and economical new method for chemically altering the paste properties of starch by a reaction which proceeds rapidly with aqueous slurries or dispersions of starch in water at room temperature. Another object of this invention is to provide a new method for the preparation of starch esters. Other objects of the invention will be apparent from the following description.

DESCRIPTION OF THE INVENTION

According to this invention, starch or a starch derivative is reacted in an aqueous suspension with an acyl phosphate under specified reaction conditions.

The starch base materials which may be used in preparing the starch ester products according to this invention may be derived from any plant source including corn, potato, sweet potato, wheat, rice, sago, tapioca, waxy maize, sorghum, high amylose corn or the like. Also included are the conversion products derived from any of the latter bases including, for example, dextrines prepared by the hydrolytic action of acid and/or heat; oxidized starches prepared by treatment with oxidants such as sodium hypochlorite; derivatized starches such as starch ethers and esters; and fluidity or thin boiling starches prepared by enzyme conversion or by mild acid hydrolysis. The use of the term "starch base" is thus seen to include any amylaceous substance, whether untreated or chemically modified which, however, still retains free hydroxyl groups capable of entering into the esterification reaction of this invention. If the desired product is to be a granular starch then obviously the initial starting material must be in granular form. It is to be noted, however, that the method of this invention may also be carried out employing gelatinized starches which will result in the production of non-granular, starch esters.

For purposes of this invention the term "acyl phosphate" means a compound corresponding to the general formula

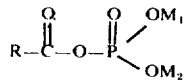

wherein R is selected from the group consisting of alkyl, substituted alkyl, alkenyl, substituted alkenyl, cycloalkyl, bicycloalkyl, unsaturated bicycloalkyl, substituted bicycloalkyl, substituted unsaturated bicycloalkyl, aryl, substituted aryl an aryl-alkyl; and $M_1$ and $M_2$ are cations, for example, hydrogen, sodium, potassium, lithium, ammonium, and the like. R may contain between 1 and 10 carbon atoms.

The preparation of acyl phosphates useful herein is well described in the literature and is ordinarily carried out by reacting selected organic anhydrides, such as those listed hereinbelow, with phosphate ions. For example, the preparation of phthaloyl and succinyl monophosphates is described by T. Higuchi, G. L. Flynn, and A. C. Shah, J. A. C. S. 89. 616 (1967). The preparation of other acyl phosphates is described by A. W. D. Avison, J. Chem. Soc., 732 (1955), G. DiSabato and W. P. Jencks, J. A. C. S. 83, 4400 (1961), D. R. Phillips and T. H. Fife, J. Org. Chem. 34. 2710 (1969).

Suitable acyl phosphates for use herein may be prepared using carboxylic anhydrides such as for example, succinic anhydride, maleic anhydride, phthalic anhydride, 1,4,5,6,7,7-hexachloro-5-norbornene-2,3-dicarboxylic anhydride (chlorendic anhydride), tetrachlorophthalic anhydride, tetrabromophthalic anhydride, propionic anhydride, chloroacetic anhydride, p-methoxybenzoic anhydride, p-methylbenzoic anhydride, endocis-5-norbornene-2,3-dicarboxylic anhydride, crotonic anhydride and p-nitrobenzoic anhydride.

The novel method of this invention comprises reacting a selected acyl phosphate as described hereinabove, with a starch base which is suspended or dispersed in water. The reaction of the acyl phosphate with the starch base is carried out at temperatures ranging from about 10°C to 90°C. The preferred temperature at which a granular starch esterification is carried out is from 20°–50°C and that for a non-granular starch esterification is from 20°–75°C. It will be recognized by the practitioner that use of temperatures above about 60°C with granular starches will result in granule swelling and filtration difficulties or gelatinization of the starch.

The pH of the reaction mixture is ordinarily controlled so as to be above 5.0 but below 12.5, with the preferred range being about 6.0 to 9.0. The pH is conveniently controlled by a periodic addition of a dilute aqueous solution of sodium hydroxide or hydrochloric acid, but other common acids or bases such as potassium hydroxide, sodium carbonate, tetramethylammonium hydroxide, phosphoric acid or sulfuric acid may be used with equal success. The pH of the reaction will determine whether acid or base is required. The practitioner will recognize that certain starch esters are readily hydrolyzed at high pH, and therefore must be prepared at a pH at which they are stable.

The amount of acyl phosphate used to react with the starch base will vary from about 1 to 125%, based on the dry weight of the starch, depending on such factors as the starch base employed, the degree of stabilization required in the end product, and the particular acyl phosphate reagent.

Reaction time will vary from about 0.2 to 24 hours depending on such factors as the reactivity of the reagent used, the amount of reagent used, the temperature and pH employed etc. After completion of the reaction, the pH of the reaction mixture is preferably adjusted to a pH of from 5.0 to about 7.0 with any common acid such as hydrochloric acid, sulfuric acid, acetic acid, or the like, or common base such as 3% aqueous sodium hydroxide. The pH of the reaction will determine whether acid or base is required. The resultant granular starch product is then recovered by filtration, washed free of residual salts with water, and dried.

Alternatively, the washed product may be drum dried, or spray dried, or gelatinized and isolated by alcohol precipitation or freeze drying. If the starch product is non-granular, it can be purified by dialysis to remove residual salts and isolated by alcohol precipitation or freeze drying.

In one variation of the described method, the pH of the reaction mixture is not controlled. In this variation an excess of base is added to the system which results in a pH in the range of 11.0 to 12.5, the acyl phosphate is subsequently added, and the reaction mixture neutralized quickly thereafter. Use of the systems wherein the pH is controlled is preferred however.

It can be appreciated by the practitioner that a large number of variations may be effected in reacting the starch base with acyl phosphates in accordance with the reaction procedure described above without materially departing from the spirit of the invention. Such variations will be evident to those skilled in the art.

The starch products resulting from the practice of this invention are starch esters, with the general reaction employing acyl phosphates being represented as follows:

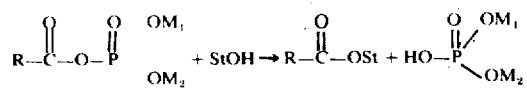

wherein StOH represents the starch molecule and R, $M_1$, and $M_2$ are as defined hereinabove. These are schematic equations which describe the chemical changes occurring during the reaction. The practitioner will recognize that the starch molecule is a polymer of glucose and contains three free hydroxyl groups per anhydroglucose unit in the polymer. (The non-reducing end glucose units contain four free hydroxyl groups.) Each of these hydroxyl groups can react as described in the equation. It is also known that the relative reactivity of each of the hydroxyl groups is not equivalent, some being more reactive than others, and that many hydroxyl groups from the same starch molecule will react to give the products of this invention.

The starch ester products prepared by the process of this invention are characterized by the stability of their dispersions. Thus, the cooked pastes derived from water dispersible corn starch ester products display improved clarity and resistance to gelling on cooling. This highly desired property permits the derivatives of this invention to be widely utilized as, for example, the sizing of paper and textiles, and in foods. Another characteristic of the starch products of this invention is a lowered gelatinization temperature as compared to untreated starches. This permits operation at lower temperatures in many industrial processes, particularly in food manufacture.

In the following examples, which illustrate the practice of this invention, all parts given are by weight unless otherwise specified.

EXAMPLE I

This example illustrates the use of succinyl monophosphate in preparing starch esters in accordance with the method of this invention wherein the resulting products display an intact granule structure.

In preparing these derivatives designated Nos. 1–15 in Table I, two basic procedures were followed.

Procedure A

A total of 50 parts starch was suspended in 62.5 parts water, and the pH of the suspension was adjusted to reaction pH with dilute acid or base. An aqueous solution of succinyl monophosphate was then added to the suspension slowly while maintaining the pH constant by periodic addition of dilute acid or base. The reaction pH will determine whether acid or base is required. After addition of the reagent is complete and the pH is constant, the starch suspension is stirred for the required time at the indicated temperature. The pH is then adjusted to 5.0 with 10% hydrochloric acid or 3% aqueous sodium hydroxide, the starch recovered by filtration, washed three times with water and dried.

Procedure B

Add 50 parts starch to a solution of succinyl monophosphate in 62.5 parts water and adjust to desired pH. The starch is reacted and recovered in an identical manner as described in Procedure A.

The succinyl monophosphate reagent was prepared by dissolving 2 parts disodium phosphate in 20 parts water, lowering the pH to 7.0 with 10% aqueous hydrochloric acid, and thereafter adding one part succinic anhydride slowly over several minutes while controlling pH at 7.0 by periodically adding 10% aqueous sodium hydroxide. After all the succinic anhydride is added and the pH is constant, the solution is stirred for an additional five minutes at room temperature.

The following table presents the pertinent data relating to the various derivatives which were prepared. Each reacted starch was analyzed for succinate content, calculated from the saponification number.

TABLE I

| Derivative Number | Starch Base | % Reagent on Starch | Procedure | Reaction Conditions pH | Temp.°C. | Time Hrs. | % Succinate in Product |
|---|---|---|---|---|---|---|---|
| 1 | Corn | 9.7 | B | 6.0 | RT | 16 | 0.99 |
| 2 | Corn | 9.7 | B | 6.0 | 10 | 1.5 | 0.38 |
| 3 | Corn | 9.7 | B | 6.0 | 40 | 1.5 | 1.14 |
| 4 | Corn | 9.7 | B | 6.0 | 52 | 1.5 | 1.00 |
| 5 | Corn | 4.9 | A | 3.0 | RT | 2.0 | 0.00 |
| 6 | Corn | 4.9 | A | 4.0 | RT | 2.0 | 0.00 |
| 7 | Corn | 4.9 | A | 5.0 | RT | 2.0 | 0.16 |
| 8 | Corn | 4.9 | A | 6.0 | RT | 1.0 | 0.67 |
| 9 | Corn | 4.9 | A | 8.0 | RT | 2.0 | 0.55 |
| 10 | Corn | 9.7 | B | 9.0 | RT | 2.0 | 0.56 |
| 11 | Corn | 9.7 | B | 10.0 | RT | 2.0 | 0.34 |
| 12 | Waxy maize | 4.9 | A | 8.0 | RT | 2.0 | 0.41 |
| 13 | High amylose corn (55% amylose by weight) | 4.9 | A | 8.0 | RT | 2.0 | 0.22 |
| 14 | Tapioca | 4.9 | A | 8.0 | RT | 2.0 | 0.34 |
| 15 | Potato | 4.9 | A | 8.0 | RT | 2.0 | 0.28 |

EXAMPLE II

This example illustrates additional representative preparations of starch esters in accordance with the method of this invention.

A total of 6.9 parts chlorendyl monophosphate was added to a slurry of 50 parts corn starch in 62.5 parts water. The pH of the mixture was adjusted to 6.0 and the mixture was thereafter stirred at room temperature for two hours. The pH was then lowered to 5.0 with dilute hydrochloric acid. The starch was recovered by filtration, washed with water, and dried. On analysis the resultant starch ester was found to contain 0.54% chlorendate groups.

In an identical manner, the above reaction was repeated except that 7.0 parts phthaloyl monophosphate was used instead of chlorendyl monophosphate, and the reaction mixture pH was adjusted to 6.5 instead of 6.0. On analysis, the resultant starch ester product was found to contain 1.8% phthalate groups.

EXAMPLE III

This example illustrates the preparation of starch esters in the presence of excess alkali.

A total of 50 parts corn starch was added to a solution of 15 parts sodium sulfate and 1.5 parts sodium hydroxide in 62.5 parts water. The pH of the resulting slurry was 12.2. The starch suspension was stirred at room temperature and a solution of 6.9 parts phthaloyl monophosphate in 40 parts water was added rapidly. After stirring for an additional 15 minutes, the pH was lowered from 11.1 to 5.0 with 10% aqueous hydrochloric acid. The starch was isolated by filtration, washed with water and dried. The starch product was found to contain 0.36% phthalate groups.

EXAMPLE IV

This example illustrates the preparation of a non-granular starch ester according to the method of this invention using a previously gelatinized starch base.

A total of 40 parts of an acid hydrolyzed waxy maize (85 fluidity) was suspended in 80 parts water. The suspension was heated on a boiling water bath for 30 minutes and then cooled to room temperature. The pH of the cooled dispersion was adjusted to 6.0 and a solution of 48.4 parts of succinyl monophosphate in 515 parts water was added. The starch dispersion was stirred for three hours at room temperature and pH 6.0, after which time the pH was lowered to 5.0 and the resulting starch product purified by dialysis and isolated by freeze drying. On analysis, the starch ester was found to contain 4.6% succinate groups.

The above reaction was repeated in an identical manner except the reaction temperature was increased to 70°C. The starch ester contained 7.2% succinate groups.

The succinyl monophosphate was prepared by dissolving 40 parts disodium phosphate in 400 parts water, adjusting the pH to 7.0 with 10% aqueous hydrochloric acid, and slowly adding 20 parts succinic anhydride while controlling the pH of the agitated solution at 7.0 with 10% sodium hydroxide. A total of 127 parts of a 10% solution of sodium hydroxide was required to maintain the pH at 7.0 during the reaction. When the addition was complete and the pH constant, the solution was stirred for 15 additional minutes.

EXAMPLE V

This example illustrates the preparation of starch esters by reacting starch with mixed carboxylic phosphoric anhydrides prepared in situ.

Derivative A

A total of 250 parts corn starch was added to 375 parts water. Then 25 parts disodium phosphate was added, the pH lowered to 7.0 with 10% aqueous hydrochloric acid, and 25 parts chlorendic anhydride added. The starch slurry was stirred at room temperature for 16 hours while controlling the pH at 7.0 by the periodic addition of 3% aqueous sodium hydroxide. The pH was then lowered to 5.0 with 10% aqueous hydrochloric acid, the starch recovered by filtration, washed with water and dried. On analysis, the starch ester Derivative A was found to contain 2.2% chlorendate groups.

Derivative B

The above reaction was repeated in an identical manner except that the disodium phosphate was omitted. When a portion of Derivative A was gelatinized by heating a suspension of it in a boiling water bath, a paste was formed possessing greater stability, as compared to a paste prepared in an identical manner from Derivative B. On analysis, the starch ester Derivative B was found to contain 1.5% chlorendate groups. These results show that while chlorendic anhydride reacts directly with starch, the presence of inorganic phosphate ions during the reaction results in a much greater reaction efficiency. This indicates that chlorendyl monophosphate is formed in situ and reacts with the corn starch as manifested by the higher ester content and greater stability of Derivative A in comparison to Derivative B.

Tetrachlorophthalate and tetrabromophthalate esters of corn starch were also prepared in an identical manner as Derivative A.

Summarizing, it is thus seen that this invention provides a novel method for the preparation of starch esters by the reaction of a starch base with an acyl phosphate. Moreover, the invention provides an efficient method for altering the paste properties of starch.

Variations may be made in proportions, procedures and materials without departing from the scope of this invention which is defined by the following claims.

What is claimed is:

1. A method for the preparation of starch esters comprising:

a. reacting a starch base in an aqueous medium at a temperature of from 10° to 90°C. and a pH of from about 5.0 to 12.5 with an acyl phosphate corresponding to the formula:

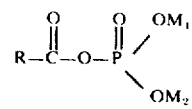

wherein R contains from 1 to 10 carbon atoms and is selected from the group consisting of alkyl, substituted alkyl, alkenyl, substituted alkenyl, cycloalkyl, bicycloalkyl, substituted bicycloalkyl, unsaturated bicycloalkyl, substituted unsaturated bicycloalkyl, aryl, substituted aryl, and aryl-alkyl; and $M_1$ and $M_2$ are cations, and b. isolating the resultant starch derivative.

2. The method of claim 1 wherein said acyl phosphate is prepared in situ in said reaction medium immediately prior to its reaction with said starch base.

3. The method of claim 1 wherein said starch base is in granular form.

4. The method of claim 1 wherein said starch base is in non-granular form.

5. The method of claim 1 wherein said starch base is corn starch.

6. The method of claim 1 wherein said acyl phosphate is tetrachlorophthaloyl monophosphate.

7. The method of claim 1 wherein said acyl phosphate is succinyl monophosphate.

8. The method of claim 1 wherein said acyl phosphate is chlorendyl monophosphate.

* * * * *

UNITED STATES PATENT OFFICE
CERTIFICATE OF CORRECTION

PATENT NO. : 3,928,321
DATED : December 23, 1975
INVENTOR(S) : Martin M. Tessler It is certified that error appears in the above-identified patent and that said Letters Patent are hereby corrected as shown below:

Column 1, line 68, delete "an", and insert --and--.

Column 3, lines 24-29, delete the first formula, and insert

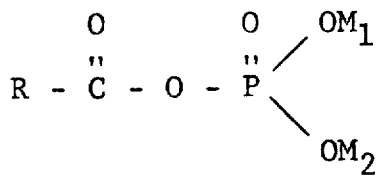

Signed and Sealed this twentieth Day of April 1976

[SEAL]

Attest:

RUTH C. MASON
Attesting Officer

C. MARSHALL DANN
Commissioner of Patents and Trademarks